(12) United States Patent
Rattin et al.

(10) Patent No.: US 8,898,716 B2
(45) Date of Patent: Nov. 25, 2014

(54) METHOD AND APPARATUS FOR DESIGNING A COMMUNICATION MECHANISM BETWEEN EMBEDDED CABLE MODEM AND EMBEDDED SET-TOP BOX

(75) Inventors: Ludovic Rattin, Voreppe (FR); Subrata Chatterjee, West Bengal (IN); Vishal Jain, Rajasthan (IN); Nitin Khanna, Delhi (IN)

(73) Assignees: STMicroelectronics International N.V., Amsterdam (NL); STMicroelectronics (Grenoble 2) SAS, Grenoble (FR)

( * ) Notice: Subject to any disclaimer, the term of this patent is extended or adjusted under 35 U.S.C. 154(b) by 1083 days.

(21) Appl. No.: 12/460,976

(22) Filed: Jul. 27, 2009

(65) Prior Publication Data

US 2010/0095339 A1    Apr. 15, 2010

(30) Foreign Application Priority Data

Jul. 28, 2008    (IN) .......................... 1777/DEL/2008

(51) Int. Cl.
*H04N 7/173* (2011.01)
*H04L 12/28* (2006.01)
*H04L 12/933* (2013.01)
*H04L 12/931* (2013.01)

(52) U.S. Cl.
CPC .......... *H04L 12/2801* (2013.01); *H04L 49/109* (2013.01); *H04L 49/00* (2013.01)
USPC ............ 725/111; 725/110; 725/117; 725/131

(58) Field of Classification Search
USPC .................................. 725/109–111, 117, 131
See application file for complete search history.

(56) References Cited

U.S. PATENT DOCUMENTS

| | | | |
|---|---|---|---|
| 2004/0212734 A1* | 10/2004 | MacInnis et al. | 348/536 |
| 2006/0269285 A1* | 11/2006 | Farmer et al. | 398/72 |
| 2006/0271946 A1* | 11/2006 | Woundy et al. | 725/9 |
| 2007/0104090 A1* | 5/2007 | Howe | 370/216 |
| 2008/0028432 A1* | 1/2008 | Hong et al. | 725/111 |
| 2008/0123568 A1* | 5/2008 | Rofougaran | 370/279 |
| 2008/0177998 A1* | 7/2008 | Apsangi et al. | 713/155 |
| 2009/0019500 A1* | 1/2009 | Tanaka et al. | 725/100 |
| 2009/0158383 A1* | 6/2009 | Taskiran-Cyr | 725/132 |
| 2011/0055879 A1* | 3/2011 | Stone et al. | 725/82 |
| 2011/0085564 A1* | 4/2011 | Taylor et al. | 370/401 |
| 2012/0063457 A1* | 3/2012 | Cha | 370/390 |

* cited by examiner

*Primary Examiner* — Nnenna Ekpo
(74) *Attorney, Agent, or Firm* — Allen, Dyer, Doppelt, Milbrath & Gilchrist, P.A.

(57) ABSTRACT

The present disclosure discloses a digital communication between the embedded cable modem (eCM) and embedded set-top box (eSTB) via a shared memory. The communication is carried out by packet transfer mechanism as per the protocol without adding any extra header overhead. The communication link is established between the eSTB and eCM mainly in layer 2 and partly in layer 1 according to an implementation of the OSI model. Further, eSTB is used as an eSAFE device coupled to eCM where the eCM and eSTB are considered to be placed on two SoCs with a separate CPU to each SoC (System-On-Chip) with a shared memory (via high speed data bus protocol). DMA (Direct Memory Access) engines are used to accelerate data transfer and to reduce load. DMA of only eCM, SoC is used to minimize hardware resources.

20 Claims, 13 Drawing Sheets

METHOD AND APPARATUS FOR DESIGNING A COMMUNICATION MECHANISM BETWEEN EMBEDDED CABLE MODEM AND EMBEDDED SET-TOP BOX

CROSS-REFERENCE TO RELATED APPLICATIONS

The present application is related to Indian Patent Application No. 1777/Del/2008, filed Jul. 28, 2008, entitled "METHOD AND APPARATUS FOR DESIGNING A COMMUNICATION MECHANISM BETWEEN EMBEDDED CABLE MODEM AND EMBEDDED SET-TOP BOX". Indian Patent Application No. 1777/Del/2008 is assigned to the assignee of the present application and is hereby incorporated by reference into the present disclosure as if fully set forth herein. The present application hereby claims priority under U.S.C. §119(a) to Indian Patent Application No. 1777/Del/2008.

TECHNICAL FIELD

The present disclosure relates to a communication protocol between embedded cable modem and embedded set-top box and more specifically to the designing of low complexity, low cost and highly reliable communication protocol between Embedded Cable Modem and Embedded Set-Top Box.

BACKGROUND

Data over Cable Service Interface Specification (DOCSIS) is an international standard adopted by many cable operators and vendors to provide internet access over existing HFC (Hybrid Fibre Coaxial) infrastructure. It includes embedded Cable modem (eCM) and embedded Set Top Box (eSTB), developed as per eDOCSIS standard issued by Cablelabs. It is widely used as a consumer box for industry for Video on demand, Interactive gaming, OOB messaging etc.

The digital communication between eCM and eSTB, transfers data via different interfaces as described by embedded DOCSIS (eDOCSIS) specification. Embedded DOCSIS (eDOCSIS) specification describes the interface between an embedded cable modem (eCM) with one or more embedded Service/Application Functional Entities (eSAFEs). The eSAFEs can be of various types such as eSTB, ePS, eMTA, eSTB, eTEA, eRouter etc. To support transmission of out of band (OOB) messages between eCM and eSTB, Cablelabs provide DOCSIS Set Top Gateway (DSG) specification that define an interface and associated protocol to support transmission of OOB messages between set top controller and customer premise equipment (CPE).

US2008/0028432 discloses a method and apparatus of Communication between embedded Cable Modem (eCM) and embedded Set-Top Box (eSTB). It describes communication between eCM and eSTB through a number of unidirectional ports where different ports are used for different types of messages. Packets with a predefined format are transmitted over TCP (Transmission Control Protocol) or UDP (User Datagram Protocol) with the physical transmission being implemented by USB (Universal Serial Bus) or Ethernet or an IP address in an upper layer protocol. However, the implementation of the cited art as described is applicable only to certain number of interfaces described under the DOCSIS standard.

SUMMARY

Figure 1:
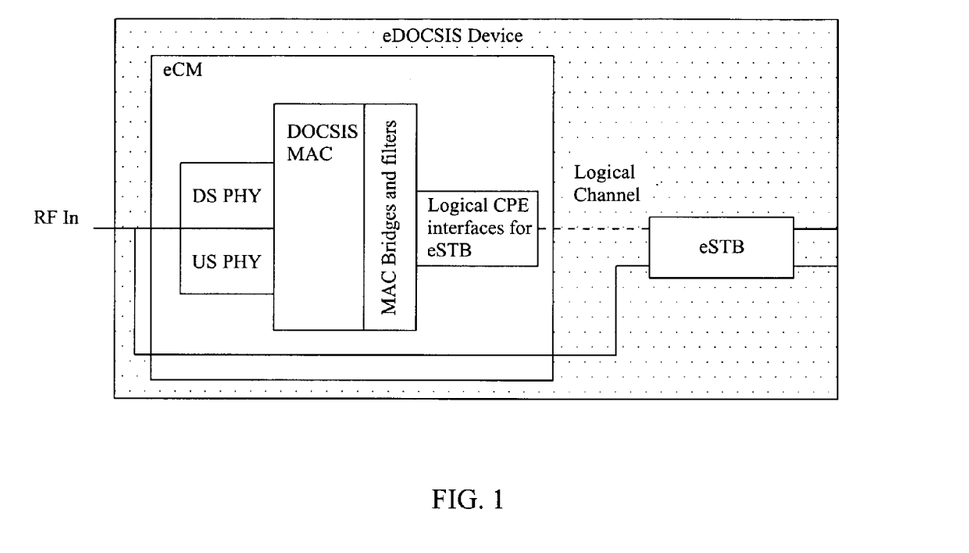
FIG. 1 illustrates an eDOCSIS reference model where an eCM and eSTB communicate with each other by means of interfaces as per eDOCSIS specification.

FIG. 1 illustrates an eDOCSIS reference model where an eCM and eSTB communicate with each other by means of interfaces as per eDOCSIS specification. Dataflow is divided into two categories namely Upstream (US) and Downstream (DS). DS data-path is from CMTS (Cable Modem Termination System) to eSTB via eCM while US data-path is from eSTB to CMTS via eCM. The data transfer takes place using HFC cable.

Figure 2:
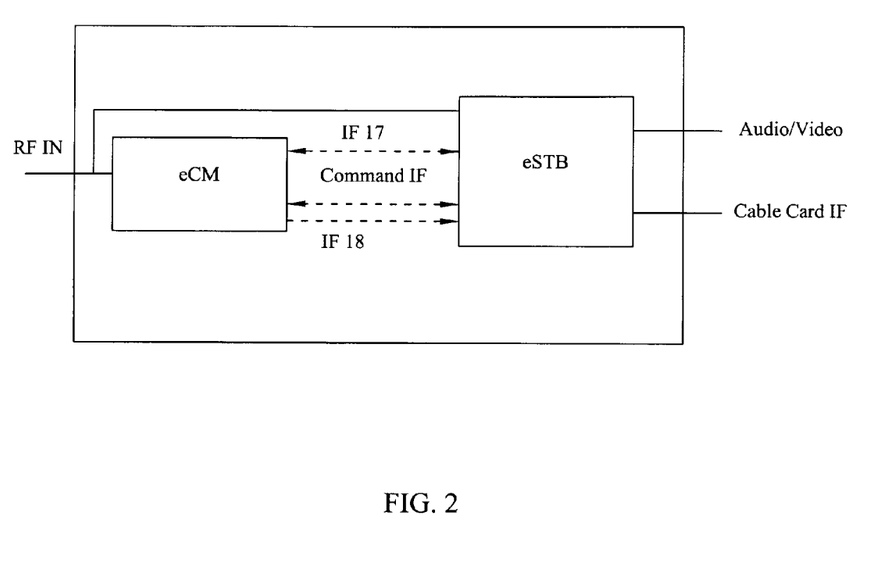
FIG. 2 illustrates an eDOCSIS reference model where eCM is coupled with an eSTB as eSAFE.

FIG. 2 illustrates an eDOCSIS reference model where eCM is coupled with eSTB as eSAFE. There are logical channels (interfaces) coupled between eCM and eSTB to carry different types of data. For example, one reserved interface (Command Interface) is used to transfer control packets between eCM and eSTB, Interface 17 is used to transfer IP data between eCM and eSTB and Interface 18 is used to transfer DSG (OOB messages) from eCM to eSTB.

A brief description of each interface is given as follows:

A. Command Interface:

A separate interface is provided for transferring control information between eCM and eSTB with a bi-directional Command interface. eSTB initiated commands for eCM can be used to transfer information such as MAC address, protocol information etc. As a master device eSTB triggers software upgrade, inquires about MIBs (management information base) via this interface. The control commands issued from eCM to eSTB, sends acknowledgement to eSTB initiated commands, eCM events are notified, then after receiving a download request from eSTB, the file is downloaded (eSTB/eCM boot image/firmware). The command interface packet transfer rate is not so high but in case of file downloading or when software is upgraded, the protocol supports the high transfer rate in downstream (eCM to eSTB).

Figure 3:
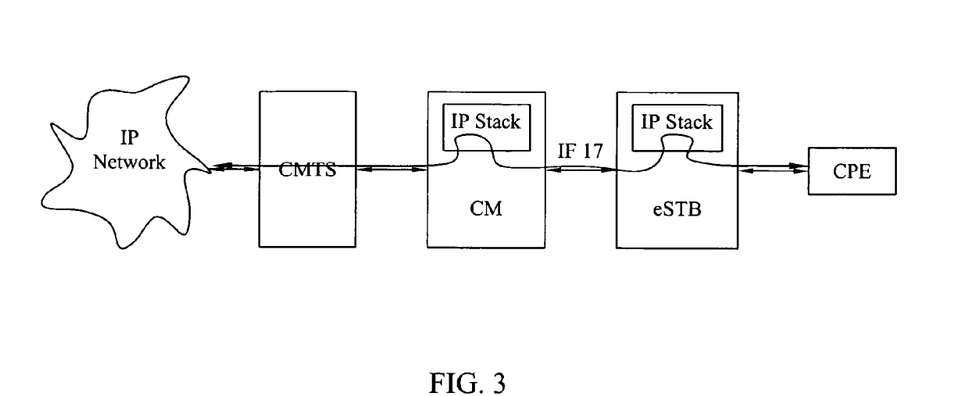
FIG. 3 illustrates an Interface 17 datapath.

B. Interface 17:

FIG. 3 illustrates an Interface 17 datapath. eCM and eSTB contain a protocol stack to process IP data with Interface to transfer IP data between eCM and eSTB. In case of interface 17 high data rate can be seen in both upstream (eSTB to eCM) and downstream (eCM to eSTB).

C. Interface 18:

The physical layer transportation of OOB messages requires dedicated hardware (OOB modulator-demodulator) and OOB messages are used to transmit Electronic Program Guide (EPG), emergency alert messaging, System information (SI) messages, Conditional Access (CA) messages etc. But DSG specification defines the communication standard and protocol needed to implement OOB messaging over the existing HFC/coaxial cable architectures as used in DOCSIS.

Figure 4:
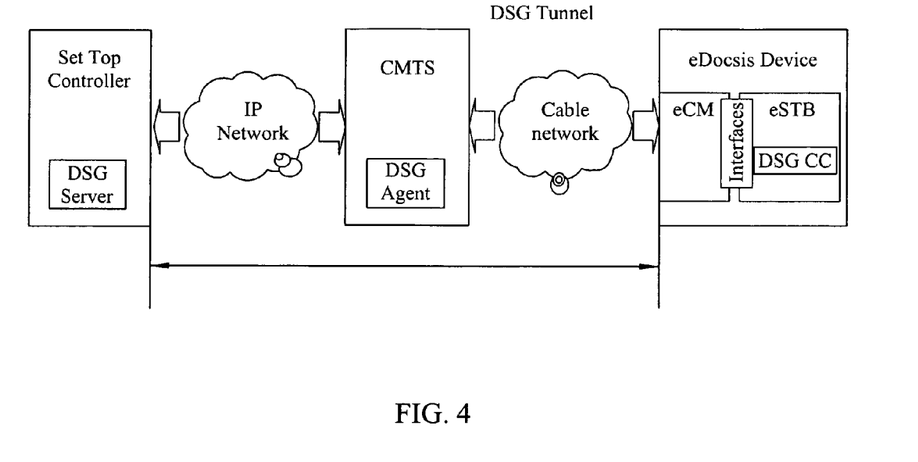
FIG. 4 illustrates a block diagram of different components in a DSG capable system.

FIG. 4 illustrates a block diagram of different components in a DSG capable system and describes OOB message communication from Set top controller to embedded set top box (eSTB) via eDoCsis CMTS. In case of Interface 18 data traffic rate is moderate and it rises in a downstream direction.

Other technical features may be readily apparent to one skilled in the art from the following figures, descriptions and claims.

BRIEF DESCRIPTION OF DRAWINGS

For a more complete understanding of this disclosure and its features, reference is now made to the following description, taken in conjunction with the accompanying drawings, in which.

DETAILED DESCRIPTION

The embodiments of the present disclosure will now be described in detail with reference to the accompanying drawings. However, the present disclosure is not limited to the embodiments. The present disclosure can be modified in various forms. Thus, the embodiments of the present disclosure are only provided to explain more clearly the present disclosure to the ordinarily skilled in the art of the present disclosure. In the accompanying drawings, like reference numerals, are used to indicate like components.

In the present disclosure, a digital communication system is being set between the eCM and eSTB via a shared memory. The communication is carried out by packet transfer mechanism as per the protocol without adding any extra header overhead. The communication link is established between the eSTB and eCM mainly in layer 2 and partly in layer 1 according to an implementation of the OSI model. Further, eSTB is used as an eSAFE device coupled to eCM where the eCM and eSTB are considered to be placed on two SoCs with a separate CPU to each SoC (System-On-Chip) with a shared memory (via high speed data bus protocol). DMA (Direct Memory Access) engines are used to accelerate data transfer and to reduce load. DMA of only eCM, SoC is used to minimize hardware resources.

In the present disclosure, an apparatus for digital communication is being set between the eCM and eSTB via a shared memory. The communication is carried out by packet transfer mechanism as per the protocol without adding any extra header overhead. The communication link is established between the eSTB and eCM mainly in layer 2 and partly in layer 1 according to an implementation of the OSI model. Further, eSTB is used as an eSAFE device coupled to eCM where the eCM and eSTB are considered to be placed on two SoCs with a separate CPU to each SoC (System-On-Chip) with a shared memory (via high speed data bus protocol). DMA (Direct Memory Access) engines are used to accelerate data transfer and to reduce load. DMA of only eCM, SoC is used to minimize hardware resources.

In the present disclosure, a method for digital communication is being set between the eCM and eSTB via a shared memory. The communication is carried out by packet transfer mechanism as per the protocol without adding any extra header overhead. The communication link is established between the eSTB and eCM mainly in layer 2 and partly in layer 1 according to an implementation of the OSI model. Further, eSTB is used as an eSAFE device coupled to eCM where the eCM and eSTB are considered to be placed on two SoCs with a separate CPU to each SoC (System-On-Chip) with a shared memory (via high speed data bus protocol). DMA (Direct Memory Access) engines are used to accelerate data transfer and to reduce load. DMA of eCM, SoC is used to minimize hardware resources.

Figure 5:
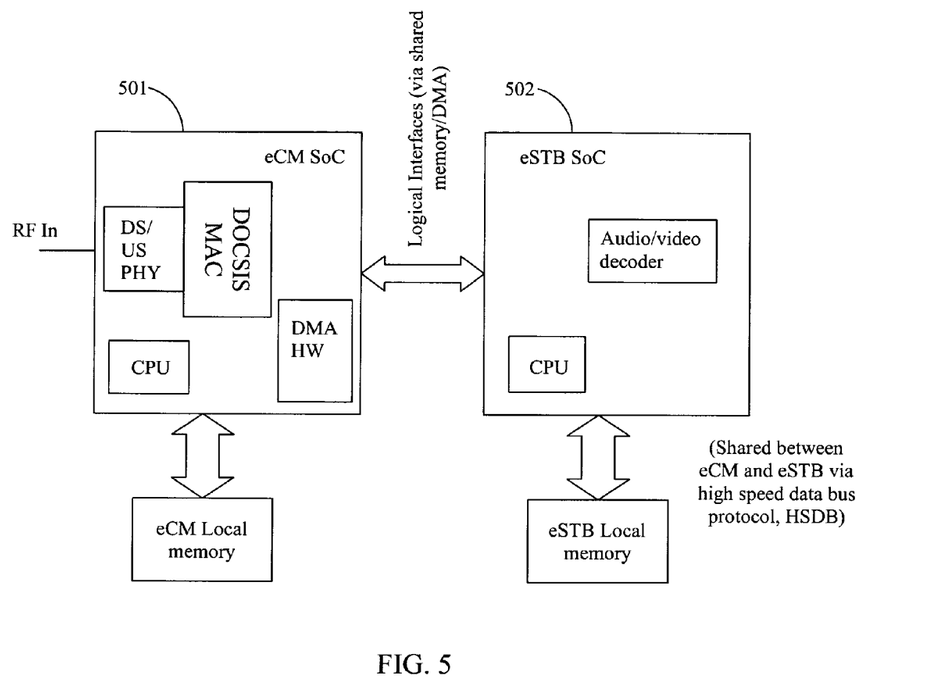
FIG. 5 illustrates a hardware block diagram of eCM and eSTB connection via shared memory according to an embodiment of the present disclosure.

FIG. 5 illustrates a hardware block diagram of eCM and eSTB connection via shared memory according to an embodiment of the present disclosure. In the present disclosure, eCM 501 and eSTB 502 are on two different SoCs with a separate CPU to each SoC. An eSTB local memory is used as a shared memory. eCM 501 accesses eSTB's shared memory and eSTB 502 accesses eCM's shared memory using HSDB (High Speed data Bus) thereby using local memory of any side for protocol purpose. DMA of only eCM SoC used to accelerate data transfer and reduce CPU load.

Figure 6:
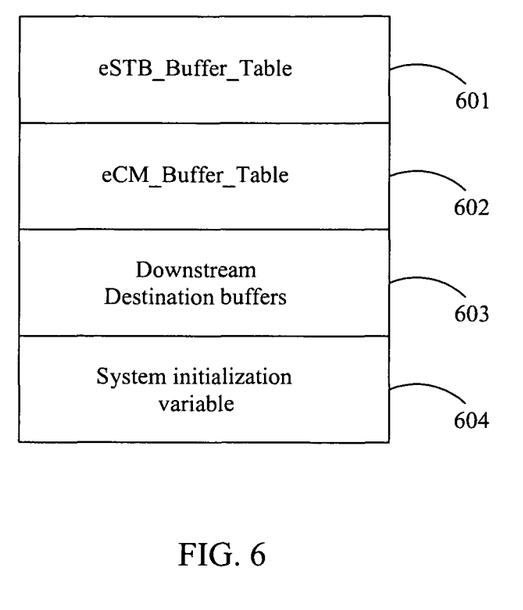
FIG. 6 illustrates shared memory layout of data structures used in implementation of an embodiment of the present disclosure.

FIG. 6 illustrates shared memory layout of data structures used in implementation of an embodiment of the present disclosure. The shared memory data structures contains an eSTB_Buffer_Table in 601, an eCM_Buffer_Table in 602, downstream destination buffers in 603 and system initialization variable in 604. The structure of eSTB_Buffer_Table and eCM_Buffer_Table formats are mentioned below.

| eSTB_Buffer_Table: | | |
|---|---|---|
| Downstream Dest addr 1 | Buffer_Status tag | InterfaceStatus tag |
| Downstream Dest addr 2 | Buffer_Status tag | |
| Downstream Dest addr 3 | Buffer_Status tag | |
| Downstream Dest addr 4 | Buffer_Status tag | |
| Downstream Dest addr 5 | Buffer_Status tag | |

During, downstream (DS) data transfer destination addresses lie on eSTB side and for a DMA data transfer both source and destination addresses should be configured such that it can let eCM know about the eSTB side's destination address eSTB_Buffer_Table is used. This table contains eSTB destination buffers which are visible to the eCM side SoC. These buffers are tagged with a status field to notify their availability. The status tag can be FREE, IN_USE or TRANSFER_COMPLETED.

| eCM_Buffer_Table: | | |
|---|---|---|
| Upstream Dest addr 1 | Buffer_Status tag | InterfaceStatus tag |
| Upstream Dest addr 2 | Buffer_Status tag | |
| Upstream Dest addr 3 | Buffer_Status tag | |
| Upstream Dest addr 4 | Buffer_Status tag | |
| Upstream Dest addr 5 | Buffer_Status tag | |

In Upstream (US) data transfer, destination addresses lie on eCM side and for DMA data transfer both source and destination addresses should be configured such that it allows eSTB know about the eCM side's destination address from eCM_Buffer_Table. This table contains eCM destination buffers which are visible to the eSTB side SoC. These buffers are tagged with a status field to notify their availability. The status tag can be FREE, IN_USE or TRANSFER_COMPLETED.

State machine for Status tag states of eCM buffers are same as eSTB buffers. To reduce hardware resource usages, a single interrupt is used for upstream transfers for all interfaces. Similarly, another single interrupt resource is used for downstream transfers of all interfaces. To handle all the packets received using single interrupt following optimization goals in design has been considered, 1) First goal is to minimize the Interrupt Service Routine (ISR) as much as possible. 2) Second goal is to reduce the overall system design complexity as much as possible.

To minimize ISR (Interrupt Service Routine) time, eSTB_Buffer_Table and eCM_Buffer_Table were added with another tag called InterfaceStatus. InterfaceStatus tag will follow the same state machine. Again for each interface separate eSTB_Buffer_Table and eCM_Buffer_Tables are used. Overall in this design, three eSTB_Buffer_Tables for three types of downstream transfers and two eCM_Buffer_Table for two types of upstream transfers are used. For each interface there are separate tables i.e. one table for command interface, one table for Interface 17 and one table for Interface 18.

Figure 7:
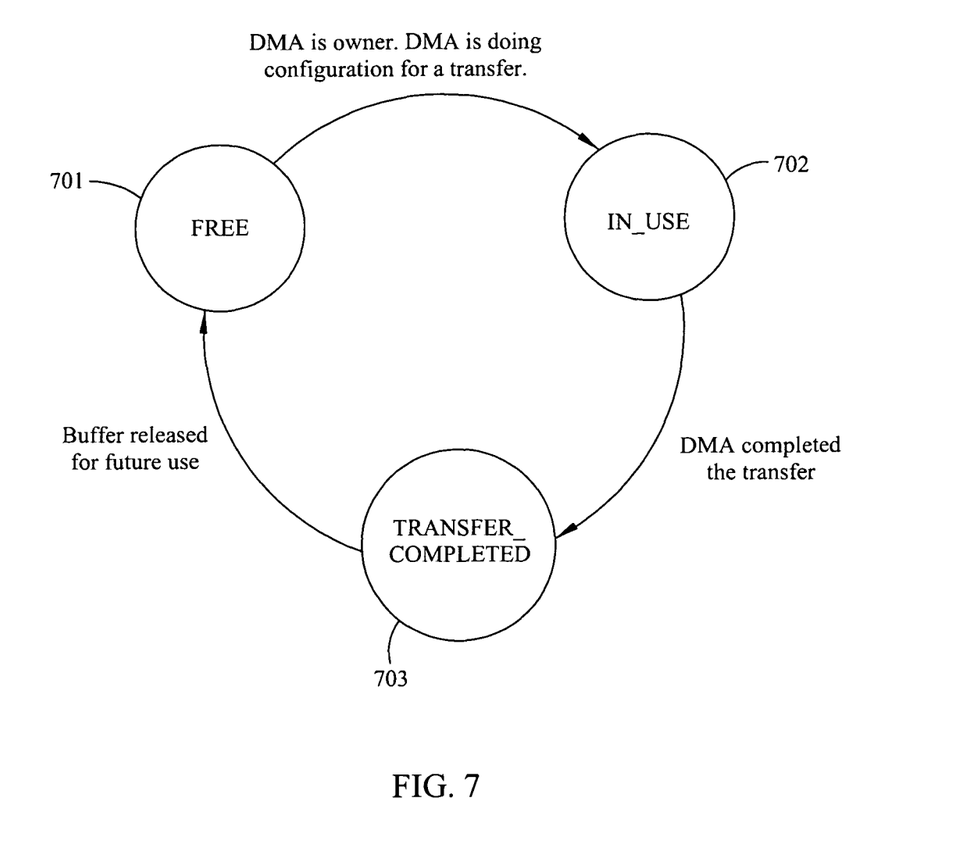
FIG. 7 illustrates a state machine of the status field of the buffers and interfaces according to an embodiment of the disclosure.

FIG. 7 illustrates the state machine of the status field of the buffers and interfaces. The state machine shows three states as 701 (FREE), 702 (IN_USE) and 703 (TRANSFER_COMPLETED). Status field of eSTB/eCM destination buffers are initially in FREE State and first DMA is configured on occurrence of a transfer. During DMA configuration, buffer state is changed to IN_USE by the initiator. After DMA is completed, an interrupt is generated on the host CPU. On receiving the transfer completed interrupt, status field of the corresponding destination address is made TRANSFER_COMPLETED.

Figure 8:
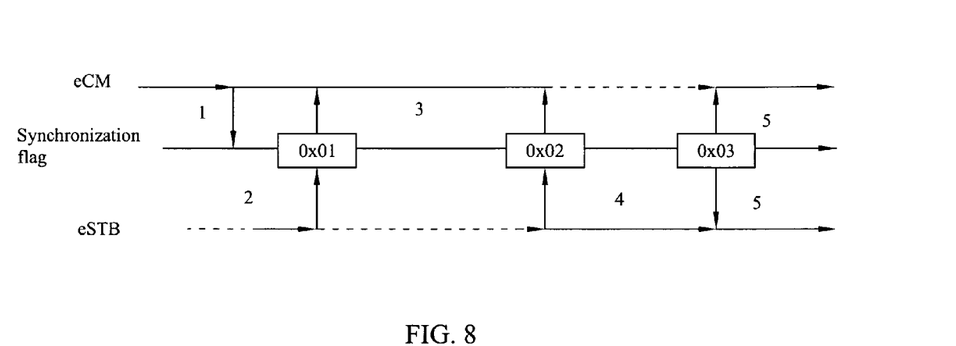
FIG. 8 illustrates a timing diagram for system initialization according to an embodiment of the present disclosure.

FIG. 8 illustrates a timing diagram for system initialization according to an embodiment of the present disclosure. Handshaking is required between both the CPU for shared tables' initialization. According to an aspect of the disclosure two different software applications are running on each CPU on either same or different operating systems and before both the CPU start transfer (Upstream transfer for eSTB and downstream transfer for eCM), the eCM and eSTB buffer tables are initialized to their initial state and the other system is notified. A synchronization flag is used in the shared memory to achieve this goal. The initialization sequences are explained in the following steps:

1. Timing state 1 shows, memory initialization other setup by eCM and hardware configuration for accessing the shared memory via high bandwidth bus protocol. eCM waits on synchronization for magic number 0x01 [action by eCM].
2. Timing state 2 shows, Table setup (eSTB_Buffer_Table initialization, downstream destination buffer creation) in shared memory space by eSTB and hardware configuration for shared memory creation. The synchronization flag is made as 0x01. Wait signal for magic number 0x02. [action by eSTB].
3. Timing state 3 shows, Table setup at eCM side (eCM_Buffer_Table initialization, Upstream destination address creation) and make the synchronization flag as 0x02. Then wait on Magic Number 0x03 [action by eCM].
4. Timing state 4 shows, magic number 0x03 as a notification to eCM about ready to packet transfer state [action by eSTB].
5. Timing state 5 shows, eCM enters into normal DOCSIS state machine. [eCM]. eSTB continues its normal operation as DSG CC [eSTB].

Figure 9:
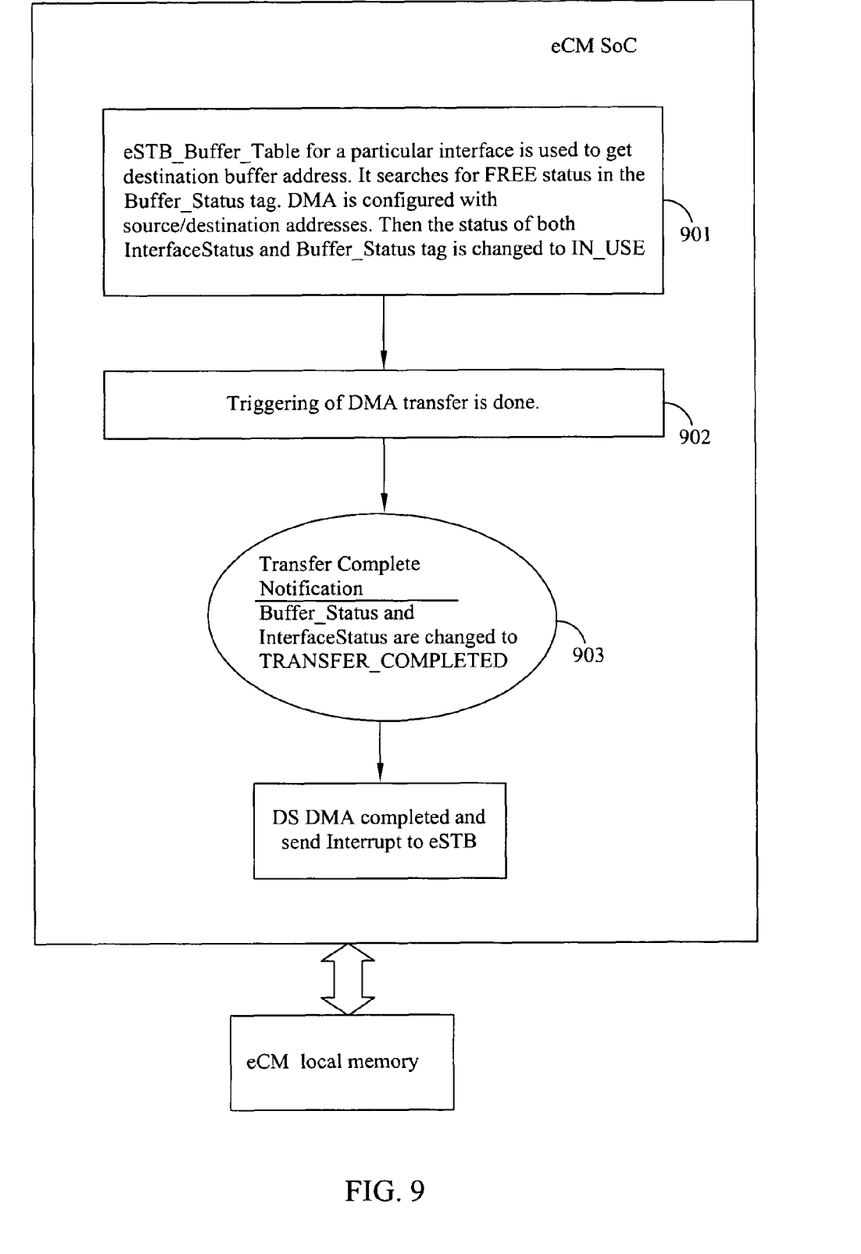
FIG. 9 illustrates a schematic representation of downstream data transfer according to an aspect of the disclosure.

FIG. 9 illustrates a schematic representation of downstream data transfer mechanism part I according to an aspect of the disclosure. It describes the details of both Downstream (DS) dataflow mechanism in the following lines:

Downstream transfer mechanism is same for all the interfaces. eSTB_Buffer_Table 901 of the particular interface is used to identify destination buffer that is required to be transported in DS. Source lies at eCM side i.e. DMA source address is located at eCM's local memory. With the initiator of transfer being eCM, DMA's destination is in shared memory to enable the transfer of buffer to eSTB's address space. The hardware operation in the present embodiment is the DMA writing from eCM local memory to shared memory. The eSTB updates eSTB_Buffer_Table with destination buffer addresses during system initialization. InterfaceStatus tags are set to FREE along with the Buffer_Status tags. Following steps describes detailed procedure of transfer.

In step 901, Source address contains the data buffer (i.e. the packet formatted according to the protocol described in above section). eCM reads the eSTB_Buffer_Table (via HSDB) for a FREE table entry. On location of a free entry, eCM updates the DMA configuration parameter with the source and destination addresses required for DMA transmission. Corresponding Buffer_Status and InterfaceStatus tags for the interface is made IN_USE.

In step 902, eCM then, triggers the DMA transfer. Once transfer is completed an interrupt gets generated on host CPU (i.e. eCM CPU) as transfer complete notification.

In step 903, after receiving interrupt, eCM then searches for buffer in eSTB_Buffer_Table with IN_USE Buffer_Status tag. On identifying an entry, eCM changes the state of the used buffer of eSTB_Buffer_Table to TRANSFER_COMPLETED as well the status of InterfaceStatus tag for the particular interface as TRANFER_COMPLETED. An interrupt to eSTB for notification of incoming packets to eSTB is then generated.

Figure 10:
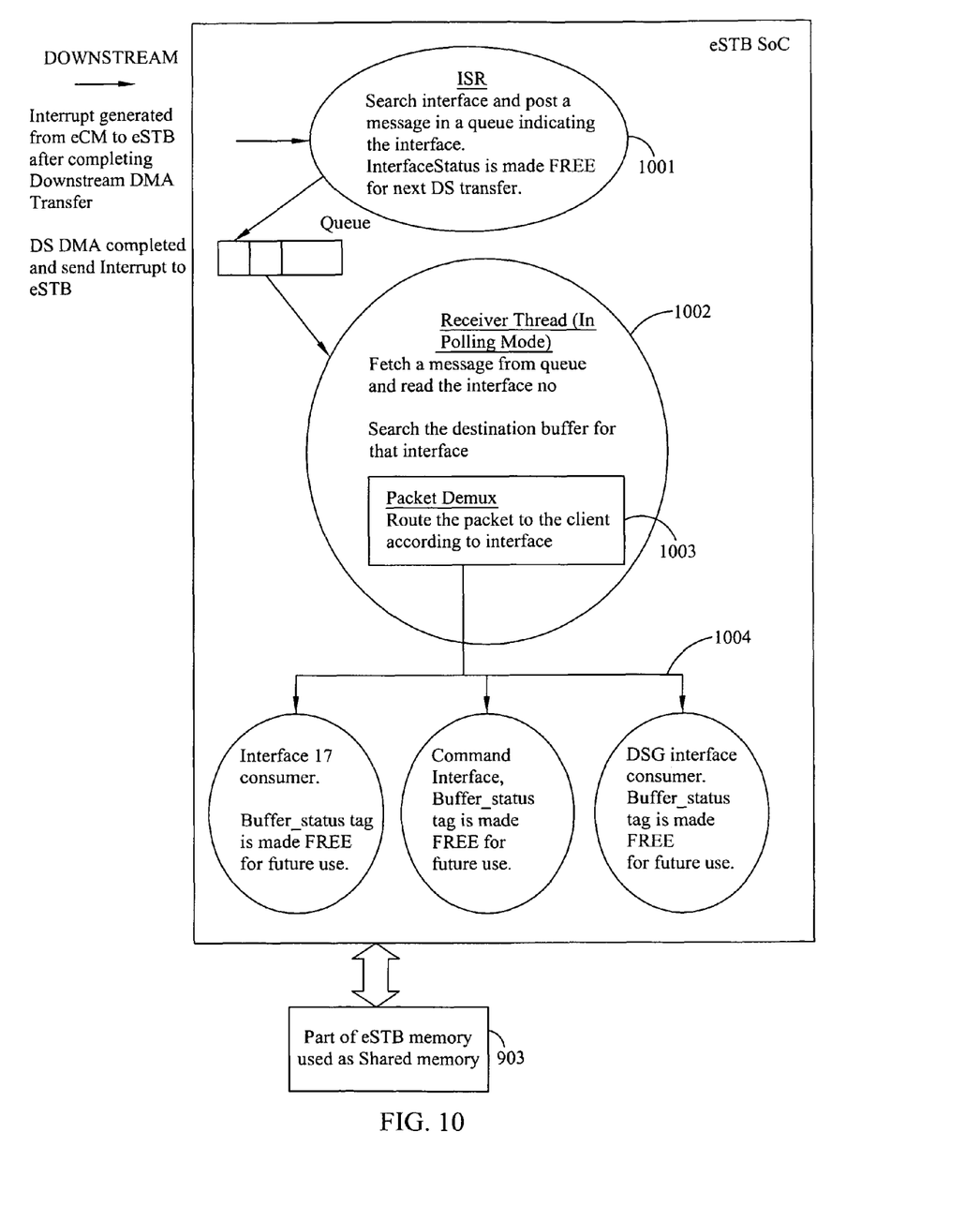
FIG. 10 illustrates a schematic representation of downstream data transfer mechanism part I according to an aspect of the disclosure.

FIG. 10 illustrates a schematic representation of downstream data transfer mechanism part II according to an aspect of the disclosure. Following steps describes detailed procedure of transfer:

In step 1001, after receiving interrupt, eSTB then searches for the Interface in the ISR. Once it identifies an InterfaceStatus tag as TRANSFER_COMPLETED, it posts a message in a queue mentioning the interface number. Then InterfaceStatus is made FREE for next downstream transfer.

In step 1002, the receiver thread (running always in polling mode on eSTB side) reads the queue. It identifies the interface number from the message and then searches the corresponding eSTB_Buffer_Table for a Buffer_status tag as TRANSFER_COMPLETED. According to the present embodiment there are a limited number of buffers, a linear search of order O (n) is used to make the implementation simple.

In step 1003, a Demultiplexer module then routes the packet to their destination consumer i.e Interface 17 handler, command interface handler or Interface 18 handler, depending on the interface number, by copying the data to each consumer's own memory.

In step 1004, the used Buffer_status tag is changed to FREE such that same destination buffer can be used for future DS transfers.

Figure 11:
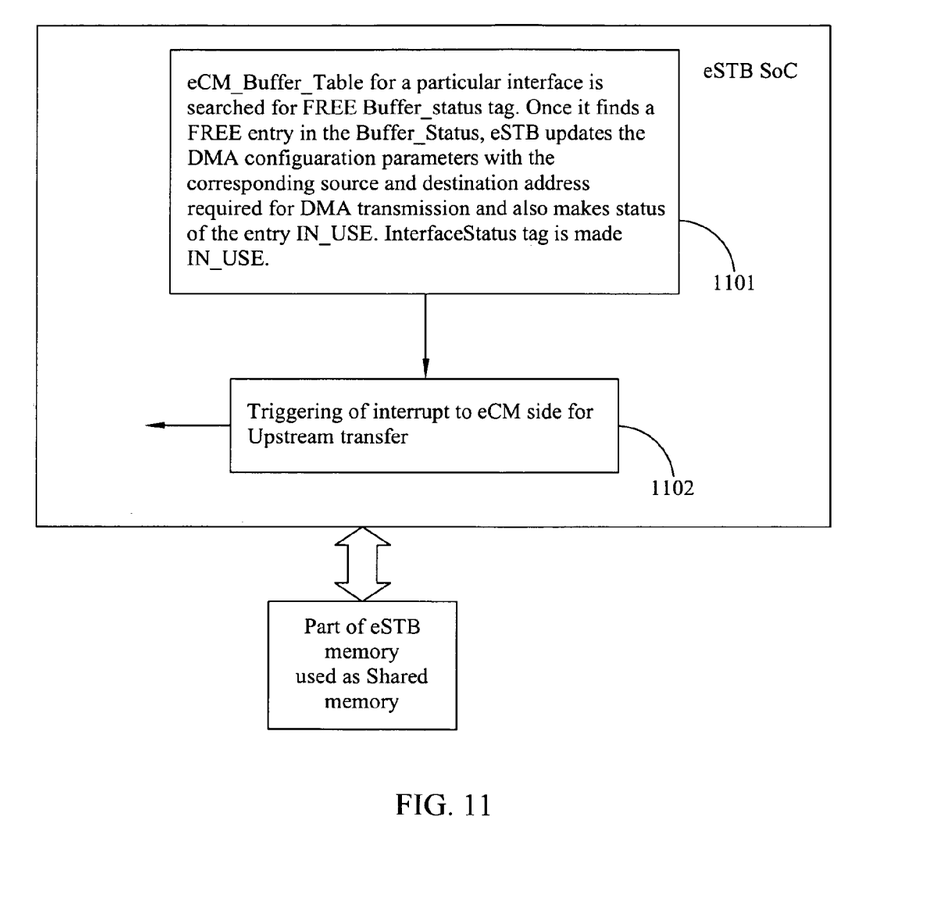
FIG. 11 illustrates a schematic representation of upstream data transfer mechanism part I according to an embodiment of the present disclosure.

FIG. 11 illustrates a schematic representation of upstream data transfer mechanism part I according to an embodiment of the present disclosure. Upstream transfer mechanism is same for all the interfaces. eCM_Buffer_Table 602 of the particular interface is used to identify destination buffer need to be transported in US. Destination address lies on eCM side local memory. Source lies at eSTB side, so DMA source address is located at eSTB's local memory which is a shared memory in the design. Initiator of transfer is eSTB. In effect hardware operation would be DMA reading from shared memory and writing to eCM's local memory. The eCM updates eCM_Buffer_Table with destination buffer addresses during system initialization to FREE along with the Buffer_Status tags. Following steps describes detailed procedure of transfer:

In step 1101, eSTB reads eCM_Buffer_Table 602 for a FREE table entry for upstream transfer destination address. On location of destination buffer with a FREE status in its Buffer_Status tag, eSTB updates the DMA configuration parameters with the corresponding source and destination address required for DMA transmission and also makes status of the entry IN_USE.

In step 1102, as DMA of eCM side is used, so to trigger the transfer an interrupt is generated to eCM side.

Figure 12:
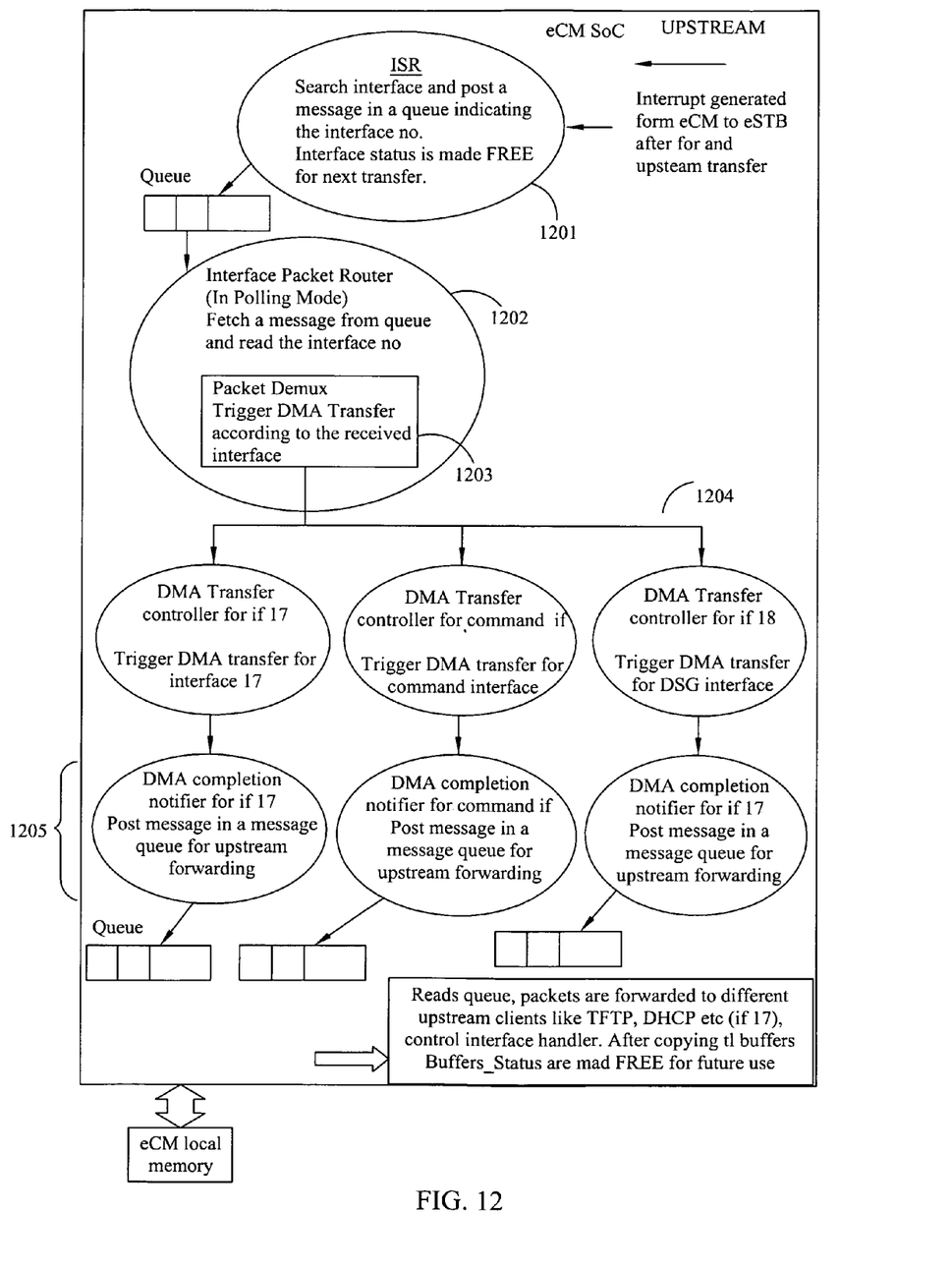
FIG. 12 illustrates a schematic representation of upstream data transfer mechanism part II according to an embodiment of the present disclosure.

FIG. 12 illustrates a schematic representation of upstream data transfer mechanism part II according to an embodiment of the present disclosure. Following steps describes detailed procedure of transfer:

In step 1201, In Interrupt Service Routine (ISR), a search is performed to identify the interface for which interrupt is received. When an InterfaceStatus tag with IN_USE is identified, a message is posted in a queue mentioning the interface number. Before exiting ISR, InterfaceStatus is made FREE for next US transfer (InterfaceStatus tag for US transfer does not need a transition to TRANSFER_COMPLETED state.

In step 1202, an "interface packet router" runs in polling mode to receive messages from the queue. Once it receives a message it reads its interface number.

In step 1203, according to the interface number read from the message, a packet demultiplexer routes for a "DMA transfer controller" for that interface.

In step 1204, in the DMA transfer controller for the particular interface an IN_USE status is searched for the BufferStatus field of the corresponding eCM_Buffer_Table. Using the address as destination address of the Upstream transfer and with a eSTB side local address as source address of transfer, a DMA transfer is invoked.

In step 1204, after completing the transfer an interrupt is generated on the eCM side CPU as "transfer completion notification". In the ISR, a destination address in eCM_Buffer_Table is searched for a Buffer_status tag as IN_USE. Once it identifies an IN_USE status it makes it as TRANSFER_COMPLETED and posts a message in separate queue for separate interfaces.

In step 1205, separate receiver threads receive the message from different queues and then searches the packet for a TRANSFER_COMPLETED Buffer_Status tag in the eCM_Buffer_Table entry. Once it locates an entry as TRANSFER_COMPLETED, it copies the data and then the Buffer_Status is made FREE for future use. Packets are then, processed and routed to their destinations (e.g TFTP, DHCP client, Command interface handler etc). InterfaceStatus tag for US transfer does not require a transition to TRANSFER_COMPLETED state.

Implemented Searching Algorithms

There are many stages where searching for Buffer_Status and InterfaceStatus are required in the various embodiments of the present disclosure. In the case of both DS and US transfers, searching of interface number using InterfaceStatus tag and destination buffer address using Buffer_Status tag is done using linear search of the order O(n). As there are three DS and two US interfaces, linear search for InterfaceStatus tag search is used as number of buffers is not so large. According to an embodiment of the disclosure, five buffers for each table are used making a linear search algorithm applicable for achieving the performance goal in case of Buffer_Status searching and offering low complexity and simple design.

Experiment Result:

According to an embodiment of the disclosure, interface 17 and command interface are tested simultaneously. For interface 17 standard "ping" commands is used. Ping is invoked from eSTB to eCM.
e.g>ping 192.168.221.140 (192.168.221.140 is eCM's IP address).

For command interface eCM boot image is downloaded to eSTB. File is of 2.2 MB. File is transferred in blocks of 1 KB size.

Part of Ping Log:

```
PING 192.168.221.140 (192.168.221.140) 56(84) bytes of data.
64 bytes from 192.168.221.140: icmp_seq=1 ttl=60 time=4.16 ms
64 bytes from 192.168.221.140: icmp_seq=2 ttl=60 time=1.31 ms
64 bytes from 192.168.221.140: icmp_seq=3 ttl=60 time=1.30 ms
64 bytes from 192.168.221.140: icmp_seq=4 ttl=60 time=1.29 ms
64 bytes from 192.168.221.140: icmp_seq=5 ttl=60 time=1.30 ms
64 bytes from 192.168.221.140: icmp_seq=6 ttl=60 time=1.29 ms
64 bytes from 192.168.221.140: icmp_seq=7 ttl=60 time=1.31 ms
64 bytes from 192.168.221.140: icmp_seq=8 ttl=60 time=1.29 ms
64 bytes from 192.168.221.140: icmp_seq=9 ttl=60 time=1.31 ms
64 bytes from 192.168.221.140: icmp_seq=10 ttl=60 time=1.29 ms
64 bytes from 192.168.221.140: icmp_seq=11 ttl=60 time=1.33 ms
64 bytes from 192.168.221.140: icmp_seq=12 ttl=60 time=1.30 ms
64 bytes from 192.168.221.140: icmp_seq=13 ttl=60 time=1.32 ms
................................................................
64 bytes from 192.168.221.140: icmp_seq=68 ttl=60 time=1.30 ms
64 bytes from 192.168.221.140: icmp_seq=69 ttl=60 time=1.32 ms
64 bytes from 192.168.221.140: icmp_seq=70 ttl=60 time=1.30 ms
64 bytes from 192.168.221.140: icmp_seq=71 ttl=60 time=1.33 ms
--- 192.168.221.140 ping statistics ---
71 packets transmitted, 71 received, 0% packet loss, time 70001 ms
rtt min/avg/max/mdev = 1.291/1.352/4.166/0.338 ms
```

Interface 17:

| Packet transferred | Packet received | Packet Loss | Time taken |
|---|---|---|---|
| 71 | 71 | 0 (% packet loss) | 1.352 ms (Round trip time for each packet) |

Command Interface:

| File size (Transferred from eCM) | File size (Received by eSTB) | Loss/Corruption | Time taken |
|---|---|---|---|
| 2.190 KB | 2.190 KB | 0 byte | ~65 sec. |

Figure 13:
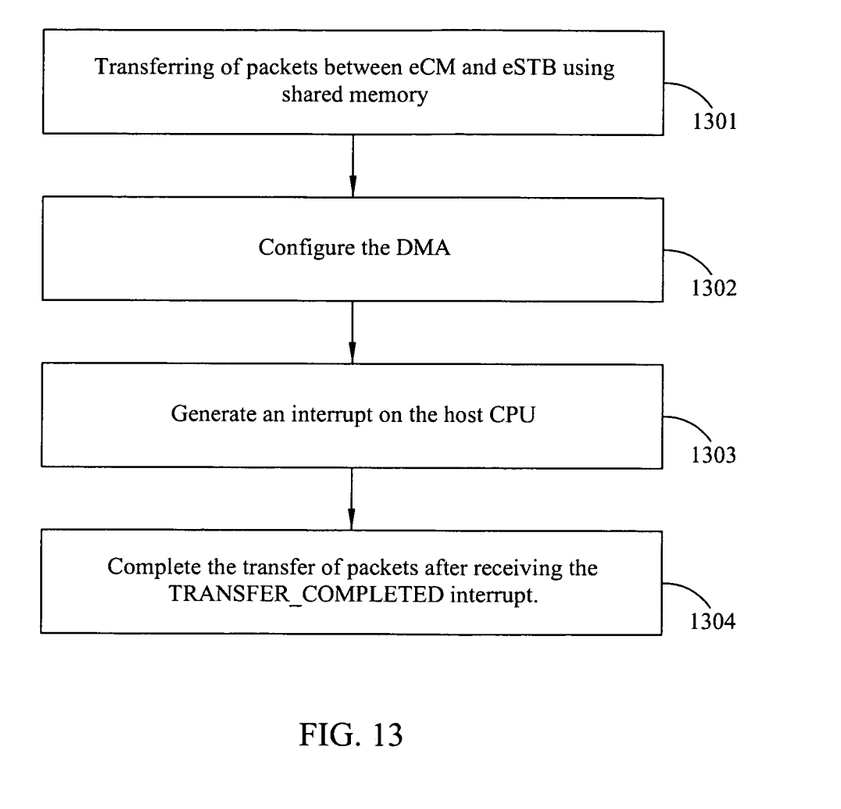
FIG. 13 illustrates a flow chart for a method of digital communication according to an embodiment of the present disclosure.

Embodiments of the method for communication between eCM and eSTB are described in FIG. 13. The methods are illustrated as a collection of blocks in a logical flow graph, which represents a sequence of operations that can be implemented in hardware, software, or a combination thereof. The order in which the process is described is not intended to be construed as a limitation, and any number of the described blocks can be combined in any order to implement the process, or an alternate process.

FIG. 13 illustrates a flow chart for a method of digital communication according to an embodiment of the present disclosure. In step 1301, the data packets are transferred between eCM and eSTB using shared memory. Whenever a transfer takes place, first DMA is configured in step 1302.

During configuration, buffer state is changed from Free to IN_USE by the initiator. After DMA is completed, in step 1303 an interrupt is generated on the host CPU. Further, in step 1304 the transferring of data packets is completed after receiving the TRANSFER_COMPLETED interrupt.

The embodiment of the present disclosure can be used in various applications in eDOCSIS on Multi-SoCs or eDOCSIS in a single SoC with two CPUs and shared memory via a common system bus. This data transfer mechanism can also be applied to non DOCSIS systems also where two or multiple CPUs need to communicate with each other via exchanging of packets.

Although the disclosure of system and method has been described in connection with the embodiment of the present disclosure illustrated in the accompanying drawings, it is not limited thereto. It will be apparent to those skilled in the art that various substitutions, modifications and changes may be made thereto without departing from the scope and spirit of the disclosure.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A digital communication system, the system comprising:
    an embedded Cable Modem (eCM) including a first System-On-Chip (SoC) comprising a Direct Memory Access (DMA) unit and a central processing unit, wherein the central process unit is configured to access a shared memory within the eCM SoC; and
    an embedded Set-Top Box (eSTB) coupled to the eCM by a packet transfer interface, the eSTB including a second SoC having a central processing unit coupled to the Direct Memory Access unit configured to access the shared memory within the eCM SoC as a local memory for the eSTB, wherein communication between the eCM and eSTB uses the shared memory,
    wherein communication between the eCM and the eSTB adds no header overhead and
    at least one buffer table configured to facilitate communication between the eCM and eSTB using the shared memory.

2. The system as claimed in claim 1, wherein the eCM is configured to communicate through a plurality of messages with the eSTB using one or more bi-directional interfaces to the shared memory.

3. The system as claimed in claim 1, wherein the eCM and the eSTB are configured to communicate with each other consistent with at least one embedded Data Over Cable Service Interface Specification (eDOCSIS) specification.

4. The system as claimed in claim 1, wherein Direct Memory Access (DMA) of the eCM is used to access the shared memory.

5. The system as claimed in claim 1, wherein the eCM and the eSTB are configured to communicate with the shared memory via packet transfer.

6. The system as claimed in claim 4, wherein DMA of only the eCM is used to access shared memory via DMA.

7. An apparatus for digital communication, the apparatus comprising:
    an embedded Cable Modem (eCM) including a first System-On-Chip (SoC) comprising a Direct Memory Access (DMA) unit and a central processing unit, wherein the central processing unit is configured to access a shared memory within the eCM SoC;
    an embedded Set-Top Box (eSTB) coupled to the eCM by a packet transfer interface, the eSTB including a second SoC having a central processing unit coupled to the DMA unit configured to access the shared memory within the eCM SoC as a local memory for the eSTB, wherein communication between the eCM and the eSTB adds no header overhead; and
    at least one buffer table configured to facilitate communication between the eCM and eSTB using the shared memory.

8. The apparatus as claimed in claim 7, wherein eCM is configured to receive or transmit a plurality of messages from or to the embedded Set-Top Box (eSTB) through one or more bi-directional interfaces to the shared memory.

9. The apparatus as claimed in claim 7, wherein the eCM and the eSTB are each configured to communicate using a communications method consistent with the embedded Data Over Cable Service Interface Specification (eDOCSIS).

10. The apparatus as claimed in claim 7, wherein downstream data transfers are directed using eSTB destination addresses and upstream data transfers are directed using eCM destination addresses.

11. The apparatus as claimed in claim 7, wherein Direct Memory Access (DMA) of only the eCM is used to access the shared memory via DMA.

12. A method of digital communication, the method comprising:
    transferring packets between an embedded Cable Modem (eCM) including a first System-On-Chip (SoC) comprising a Direct Memory Access (DMA) unit and a central processing unit wherein the central processing unit is configured to access a shared memory within the eCM SoC and an embedded Set-Top Box (eSTB) coupled to the eCM by a packet transfer interface and including a second SoC having a central processing unit coupled to the DMA unit and configured to access the shared memory within the eCM SoC as a local memory for the eSTB using the shared memory, wherein communication between the eCM and the eSTB adds no header overhead;
    configuring the eCM and the eSTB to receive direct memory access (DMA) data transfers through the eCM; and
    employing at least one buffer table to facilitate communication between the eCM and eSTB using the shared memory.

13. The method as claimed in claim 12, wherein the at least one buffer table comprises eCM and eSTB buffer tables and, prior to starting data packet transfers between the eCM and the eSTB, the eCM and eSTB buffer tables are initialized and other system units are notified of the initialization.

14. The method of claim 12, wherein transfer of the packets between the eCM and the eSTB is conducted through a bi-directional interface.

15. The method of claim 14, wherein the eCM receives and transmits a plurality of messages through the bi-directional interface.

16. The method of claim 15, wherein the eSTB receives and transmits a plurality of messages through the bi-directional interface.

17. The method of claim 16, wherein the eCM and the eSTB communicate with each other consistent with at least one embedded Data Over Cable Service Interface Specification (eDOCSIS) specification.

18. The method of claim 16, wherein downstream data transfers are directed using eSTB destination addresses and upstream data transfers are directed using eCM destination addresses.

19. The method of claim 16, wherein DMA of only the eCM is used to access the shared memory via DMA.

20. The method of claim 14, wherein the eSTB receives and transmits a plurality of messages through the bi-directional interface.

* * * * *